Figures 1, 2:
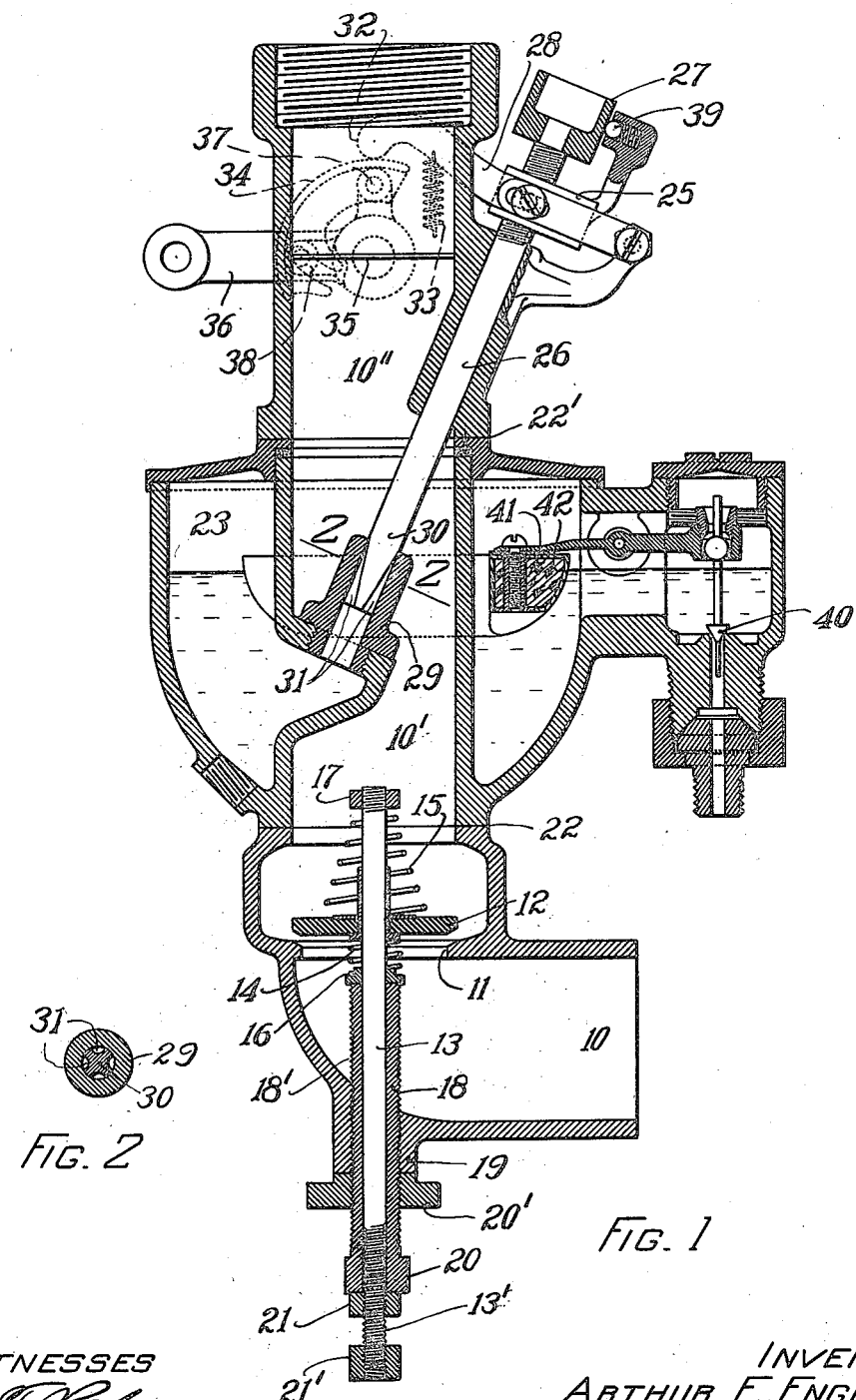

A. E. ENGLAND.
VALVE FOR CARBURETERS AND OTHER APPARATUS.
APPLICATION FILED JAN. 29, 1908.

961,590.

Patented June 14, 1910.

WITNESSES
A. T. Palmer
Thos. C. Field.

INVENTOR
ARTHUR E. ENGLAND
BY HIS ATTORNEY
Everett Kent

UNITED STATES PATENT OFFICE.

ARTHUR E. ENGLAND, OF BOSTON, MASSACHUSETTS, ASSIGNOR OF ONE-HALF TO JAMES A. YANTIS, OF MALDEN, MASSACHUSETTS, AND ONE-HALF TO FRANK P. WOODBURY AND WILLIS DU BOIS PULVER, OF SALEM, NEW HAMPSHIRE.

VALVE FOR CARBURETERS AND OTHER APPARATUS.

961,590. Specification of Letters Patent. Patented June 14, 1910.

Application filed January 29, 1908. Serial No. 413,475.

*To all whom it may concern:*

Be it known that I, ARTHUR E. ENGLAND, of Boston, in the county of Suffolk and State of Massachusetts, have invented certain new and useful Improvements in Valves for Carbureters and other Apparatus, of which the following is a specification.

This invention relates to valves; and it is here particularly shown and described as it may be applied to the arrangement and operation of valves in carbureters, although the principles are not limited to carbureters in their application and the patent is therefore not to be limited to the carbureter embodiment of the invention, which is here set forth as being the best means of illustrating and setting forth the invention.

More specifically the invention relates to valves which have an intermittent action during the operation of the apparatus in which they are set, such as the air admission valve in a carbureter; and to valves for controlling the entrance of liquid such as gasolene or alcohol to a reservoir and its passage thence, and its mixture with air.

In some carbureters there is a valve in the air passage which is opened automatically by suction of the engine and is closed by some means in the interval between these periodic openings. The closing means commonly consists of a spring which forces the valve to its seat. In the continuous operation of a gasolene engine in an automobile or motor boat the action of such a valve produces a repeated clicking sound, which it is one of the objects of this invention to eliminate. It has hitherto been the custom to provide a by-pass which remains always open around the valve, so that even when the valve is closed some air can pass. This has been accomplished by making holes through the valve or by making a gap in its edge.

It is one object of the invention to substitute for the individual jets which pass through such openings an air current of substantially uniform annular form adapted to mix uniformly with the gasolene; to produce means by which the thickness of this annular jet may be adjusted uniformly at will; and to facilitate the mixing by causing the entering fuel to be projected into it in diagonal cross jets which penetrate and mix uniformly with the body of air in the annular current. A temporary supply of liquid fuel such as alcohol or gasolene is maintained in a reservoir close at hand, from which these fuel jets are drawn.

Another feature of the invention relates to valve controlling means for maintaining this supply by a new construction of float.

Another feature relates to means for controlling the size of the openings which form the said fuel jets, thereby controlling the fuel supply to the engine.

The objects are accomplished by the apparatus hereinafter described, reference being had to the accompanying drawing, in which—

Figure 1 shows a sectional elevation of one form of apparatus embodying the invention; and Fig. 2 is a detail in section on line 2—2 of Fig. 1.

Referring to the drawing, 10 represents an inlet pipe or passage for air to a carbureter. An annular ledge or narrower portion 11 is provided, forming a seat for the valve 12. The valve is mounted on a stem 13, on which it is movable; and the stem itself reaches outside the apparatus and is mounted adjustably by screw threads 13' and is movable within a sleeve 18, which in turn is adjustable with respect to the valve seat 11 by screw threads 18' in a boss 19 in the casing or side of pipe 10. Two springs 14 and 15 are strung on the valve stem. The spring 14 fits on the inlet side of the valve between the valve and a shoulder 16 on sleeve 18; and the spring 15 fits on the inlet side between the valve and a nut 17 on the stem. It is contemplated that the nut 17 shall be fastened permanently on the stem 13. Spring 14 will ordinarily be stiffer than spring 15. In action the valve is drawn inward by suction of the engine, thus compressing spring 15 and opening the passage for admission of air. When the suction ceases spring 15 returns the valve toward its seat, till it encounters spring 14 which arrests it before it actually reaches seat 11. This leaves an annular passage always open between the valve and its seat, even when the valve is in the position that would ordinarily be called "closed", because the valve seats itself upon the axial spring 14 before it reaches the narrow portion 11 of the passage 10 which ordinarily constitutes the seat of a valve. This spring seat of the valve constitutes the zero position from which the valve starts to open farther when drawn by the engine. The zero position may be changed with respect to the seat 11, thus varying at will the degree which the passage 10 is actually open when the valve is at this zero position, by adjusting sleeve 18 toward or from the seat 11. 20 is a knurled nut on this sleeve, by turning which the screw threads 18′ move the sleeve forward or back; and 20′ is a lock nut for holding it when suitably adjusted. The tension of spring 15 may be adjusted by turning knurled nut 21, and moving stem 13 and the stop 17 at its inner end against which spring 15 rests to a greater or less distance from the inner end of sleeve 18. 21′ is a lock nut to hold nut 21 stationary on stem 13 when thus adjusted. The portion of the air passage containing this valve is shown in the drawings as a separate piece which may be attached to a carbureter, by a flange or screw joint or otherwise at 22.

In the carbureter portion is a reservoir 23 adapted to contain alcohol, gasolene or other liquid fuel ready for immediate use in the customary manner. The continuation of passage 10 is here marked 10′, and its wall has a hollow post 29 having a cylindrical passage through which fuel enters from reservoir 23, the flow being controlled by the fuel valve 30 which forms a plug for the passage. The continuation of the passage leading to the engine is marked 10″ and this may be attached to the carbureter portion in any convenient way at 22′. In the wall of this is a boss through which a shaft 26 enters in line with hollow post 29. The inner end of this shaft forms the plug valve 30 which fits the hollow interior of the post, and is at its sides cut into grooves deepening and having divergent sides enlarging as they approach the end of the shaft. A cross section of these grooves is shown in Fig. 2 and the divergence of them is indicated in Fig. 1; the grooves being marked 31. The upper end of the shaft 26 is mounted in a screw block 25 and has a knurled nut 27 for adjusting it therein so that more or less of the upper portion of grooves 31 stand above the end of post 29. The portions of the end of shaft 26 which remain not cut away by grooves 31 center that portion of the shaft in the post. The divergence of the grooves may be as great as desired and the grooves may be as numerous as desired.

The block 25 is represented as mounted on a lever 28 having a pawl 32 pulled by a spring 33 against the cam 34 which is mounted on the shaft with the throttle valve 35 operated by the lever 36. Turning lever 36 turns the throttle valve 35 and at the same time through the action of the cam raises the block 25, thus varying the opening from reservoir 23 through grooves 31 into passage 10′. The cam 34 is represented as adjustable by swinging outward on pin 37 to any desired degree where it may be fastened by a clamp nut 38. The axis of this nut runs directly away from the eye as seen in Fig. 1, the nut being screwed into a boss on the back side of the pipe 10″ clamping the swinging cam fast thereto. The face of the cam, which is here represented as a quadrant of a circle, may be of any desired form.

The apparatus is represented as set up to act upon the theory that the fuel valve should be opened wider when the throttle is opened wider; but by changing the face of the cam as desired an arrangement may be made for opening the fuel valve a proper amount with the initial opening of the throttle, and afterward for opening it less rapidly than the throttle and for partially closing it as the throttle opens wider, if it is desired to have the apparatus work on the theory that less opening of the fuel valve is needed when the throttle is opened widest. The nut 27 is supposed to be a knurled nut and a spring pressed ball 39 bears against it checking it gently against accidental turning.

The reservoir is maintained filled to a constant level. The means ordinarily provided for maintaining the level consists of a float-controlled admission valve 40 from a supply reservoir. Heretofore floats have been made of cork. This has the disadvantage that in the course of time the cork absorbs the fluid and becomes water-logged so that it opens the supply valve and maintains it open when no supply is needed. As a substitute for these, hollow metal floats have been proposed; but owing to the high specific gravity of metal these have to be of considerable size in order to be sufficiently buoyant to sustain the thickness and weight of metal which is necessary in order that the walls of the float be thick enough to hold their shape and to avoid puncture under ordinary conditions of hardship and usage. I have conceived the idea of providing a cork float having a metal casing electrically or chemically deposited upon its surface. In such a float the layer of metal may be exceedingly thin and therefore light, because its strength is supported and sustained at all points by the body of cork. Nevertheless it will stop the percolation of the fluid into the cork; and it remains permanently in this condition, not being soluble in alcohol, gasolene or other liquid fuel; while if any puncture in the thin metal casing occurs by accident or otherwise, the amount of liquid which might enter therethrough is so slight that no serious effect upon the buoyancy of the fluid is occasioned thereby. This float is formed by taking a cork body of the shape desired, coating it with carbon in the form of graphite, or other suitable body, to receive an electrolytic deposit of metal such as copper, an adhesive being used to hold the graphite in place if necessary, and then immersing it in a chemical or an electrolytic bath for the deposit of a thin film of metal over the entire surface. In the drawing this float is U-shaped as customary and is seen in section through the middle part of the U, the cork being marked 41 and its metal coating 42. The thickness of the coating is much exaggerated in order to be seen in the drawing.

When this system of valves is applied to a carbureter, the whole apparatus is inactive so long as no air can pass the throttle valve 35. If the throttle valve have a permanent gap, as is customary, the suction of the engine is communicated to the space 10' to a limited degree. Air flows in past valve 12 according to the amount of suction, always in the form of an annular current, whether its quantity be large or small. The suction also draws fuel through the grooves 31, the fuel issuing in jets, one from each groove, which are thrown into this current which still retains its annular characteristic to some extent, all being discharged at the center and some being thrown diagonally through it to its circumference. This gives an immediate distribution of fuel through the body of moving air which rapidly becomes a more perfect mixture as the current passes on. The uniformity of mixture tends to produce uniformity and completeness of combustion in the engine cylinder; and this means economy of fuel and elimination of the offensive odor which is at present so characteristic of many automobile engine exhausts. Upon opening the throttle farther, the suction in chamber 10' is increased, tending to draw more fuel and more air. The problem of adjusting the relative intakes of fuel and air so as to secure uniformity of mixture under a wide range of suction conditions is one to which the present invention applies.

When an engine is running with very little power—as in an automobile when the car is stationary—it is necessary that the engine receive enough fuel and enough air at each complete cycle to form a proper explosive mixture and keep the engine running. In order to prevent too great suction of gasolene, which would be both uneconomical and also possibly productive of an incombustible mixture, it is necessary to employ a throttle valve to reduce the draft or suction of the engine through the carbureter. When this throttle is closed the suction upon the air admission valve is slight and there is danger of its not being strong enough to open an ordinary air valve (not embodying the invention) against the tension of its spring, in which case the engine smothers itself, owing to its pull being too gentle to draw in enough air. To guard against this, air valves have heretofore been provided with fixed openings or gaps through which air can enter notwithstanding the valve is seated. Air thus entering comes in a solid body or jet which does not become thoroughly mixed with the gasolene as it should and as is especially needful when the action is delicate, as at low speed. Other makers have omitted the air valve completely thus avoiding the above difficulty by always admitting a large amount of air; but under these circumstances it is hard to get the right mixture when slowing down after a run as free influx of air prevents suction of fuel. The air admission valve above described, embodying the invention, can be set with its annular gap precisely right for light work and delicate action, as determined by observation, judgment or experiment according to the characteristics of the particular variety and size of engine to which it is applied, which may be called its zero position, and the air is so sprayed that it receives a well distributed charge of fuel. The valve remains motionless or nearly so under gentle suction but under increased suction the valve opens against its spring 15 as much as needed, returning to its zero position promptly and seating itself against spring 14 noiselessly at the close of each stroke. If it is found that the mixture is not perfect when the engine is on heavy duty the tension of spring 15 can be changed, without materially disturbing the zero gap used under light duty. As the spring 14 is stiffer than spring 15 the tension of the spring may be varied between relatively wide limits without getting it strong enough to make much impression upon spring 14. However, in case adjustment of the spring 15 reduces the air gap too much the correction may be instantly made by turning the nut 20 which moves the sleeve 18 and the valve and spring 15 as a unit to the desired distance from the valve seat. When the zero gap and the tension of spring 15 have been adjusted to suit the peculiarities of the particular engine with which the carbureter is to work the adjustment may remain untouched, under all sorts of engine duty. Conditions arise, however, in which it is very desirable to change the zero air gap, and this invention is the first of which I am aware by which this can be done. This is required by some atmospheric conditions such as the rarefied air found at high elevations, and also by local changes of temperature and humidity; also sometimes by change of quality of fuel. As the zero position of the valve 12 can be changed by simply moving the sleeve 18 in which all the parts are mounted, it is to be noted that in adjusting the air gap no change in the tension of spring 15 need be made; and the valve may open with the same tension whatever the adjustment of its zero gap. However, if the operator desires, the gap may be made so wide as to be equivalent to complete removal of the valve, or may be eliminated entirely, or may be set at any intermediate stage. This is a feature of considerable importance because there is much diversity of opinion as to the proper way to operate an engine and carbureter, and to obtain a proper mixture; and by this invention the user is free to work upon his own theories and to change either gap or tension or both in emergency or for special purposes at will.

Another advantage of the form shown in the drawings is the facility it affords for starting an engine when the fuel is sluggish in responding, which may be due to cold or to other cause. As the stem 13 is loose within sleeve 18 the projecting end 13' of the stem may be pulled out with the fingers until valve 12 is seated, thus closing temporarily the zero gap. This increases temporarily the suction of the fuel, and when the flow of fuel is started the valve stem may be released to its normal position. Any kind of stop may be used to prevent the seating of valve 12, but the spring is preferred because of the advantage last stated in starting, because of its noise-eliminating effect in operation and because of the recoil action by which it assists the valve 12 in opening. So also the invention is not limited to the particular style of valve 12 illustrated, but this is preferred as it produces an annular current of air. The arrangement of valve 30 shown is well adapted to treat such an annular current. Separate grooves 31 form minute nozzles and as the bottoms of these grooves are inclined to the axis of the plug and shaft 30, 26, the fine jets of fuel are directed outward at an angle to this shaft; and as the shaft is set diagonally this causes part of the jets to be thrown into and through the current of air and part to be sprayed in the central portion of the passage, while the opposite portion of the passage does not need the spray so much owing to the deflecting effect of the protuberance 29 in the passage 10'. If desired, the valve 30 might easily be arranged with its axis parallel to the axis of passage 10', the passage 10" being if preferred led off to one side instead of straight up as shown. Delicacy of graduation in the valve 30 may be attained by making the grooves 31 but slightly divergent and precision of action of this valve is attained by its consisting of a shaft centered in bearings at both ends.

I claim:

1. The combination, in a carbureter, of a valve and two springs pressing oppositely thereon; the one spring being relatively weaker and yielding to allow opening of the valve and returning elastically to close it and the other spring being relatively stiffer and constituting a stop for the closing movement of the valve and first described spring; the relation between the springs being such that the stiffer spring is approximately incompressible by the weaker spring, forming a cushion stop for the valve but not substantially participating in the travel of the valve when the valve opens; there being means constituting a complete support for both springs adjustable in position with respect to the valve seat; and said valve being located in a passage in the carbureter, open to the suction of a motor fed by the carbureter, and the opening of the valve being actuated by said suction.

2. In combination, in a carbureter, a throttle valve in the engine supply passage, a fuel valve leading to said passage, connections between the fuel valve and the throttle valve comprising a cam actuated with the throttle, and a pawl engaged by the cam and carrying the fuel valve screw-mounted on the pawl.

In testimony whereof I hereto affix my signature, in presence of two witnesses.

ARTHUR E. ENGLAND.

Witnesses:
 EVERETT E. KENT,
 JOSEPH T. BRENNAN.